United States Patent
Ladouceur et al.

[11] 3,711,931
[45] Jan. 23, 1973

[54] METHOD OF FORMING FASTENER STRIP

[75] Inventors: Harold A. Ladouceur, Livonia; John H. Matthews, Royal Oak, both of Mich.

[73] Assignee: Multifastener Corporation, Detroit, Mich.

[22] Filed: April 1, 1971

[21] Appl. No.: 130,335

[52] U.S. Cl. ......................29/412, 29/432, 29/509, 10/86, 151/41.71, 151/41.73, 206/56
[51] Int. Cl. ..............................................B23p 17/00
[58] Field of Search........29/509, 432, 515, 521, 417, 29/412; 151/41.71, 41.73; 10/86; 206/56 R; 221/73

[56] References Cited

UNITED STATES PATENTS

| | | |
|---|---|---|
| 3,117,610 | 1/1964 | Matthews..........................151/41.71 |
| 3,140,010 | 7/1964 | Double................................221/73 |
| 3,152,628 | 10/1964 | Strain et al...................29/432 UX R |
| 3,177,915 | 4/1965 | Fleur et al....................29/432 UX R |
| 3,348,669 | 10/1967 | Powers............................29/417 X R |

*Primary Examiner*—Charlie T. Moon
*Attorney*—Cullen, Settle, Sloman & Cantor

[57] ABSTRACT

This disclosure relates to a preoriented fastener system which is particularly suitable for piercing fasteners and the like which require high speed feeding systems and which must be oriented prior to securement. The method disclosed herein includes forming, as by rolling, a continuous metal strip having a cross section conforming to the cross section of the desired fastener. The strip is then chopped into separate fasteners and a threaded aperture is formed in each fastener. The fasteners are then reassembled into a strip form by orienting the fasteners into serial alignment corresponding to the continuous metal strip and joined by readily frangible connector means, such as a pair of wires. The strip may then be coiled and delivered to the installation station.

The disclosed fastener includes a pair of parallel retainer grooves adapted to receive a pair of retaining rods or wires which secure the fasteners in the preoriented strip form. The disclosed embodiment of the fastener is a pierce nut, which includes a generally rectangular body portion having a piercing face and a pair of flanges at the opposite face; one flange extending from each end of the nut. The rod retaining grooves are generally perpendicular to the opposite sides of the nut and located between the flanges and the axis of the threaded aperture. In the disclosed embodiment, the rods are inserted in the retaining grooves and the fastener adjacent the grooves is deformed to retain the rods in the grooves.

13 Claims, 14 Drawing Figures

PATENTED JAN 23 1973 3,711,931

INVENTORS
HAROLD A. LADOUCEUR.
J. HORTON MATTHEWS.
BY
CULLEN, SETTLE, SLOMAN & CANTOR.
ATT'YS.

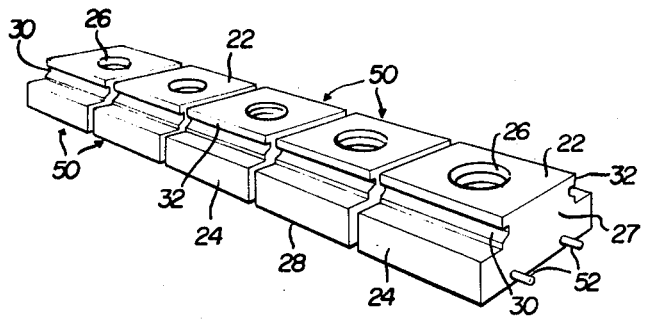
FIG. 4
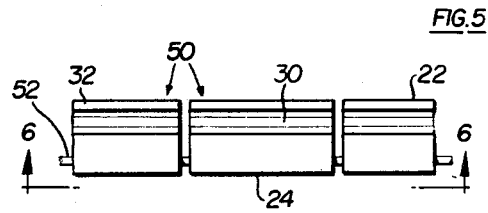
FIG. 5
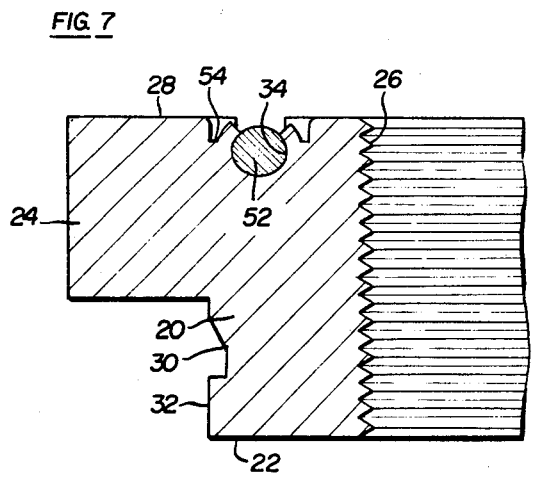
FIG. 7
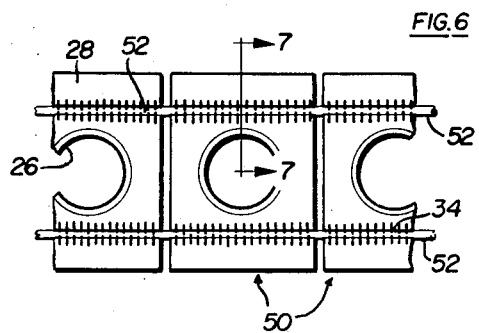
FIG. 6
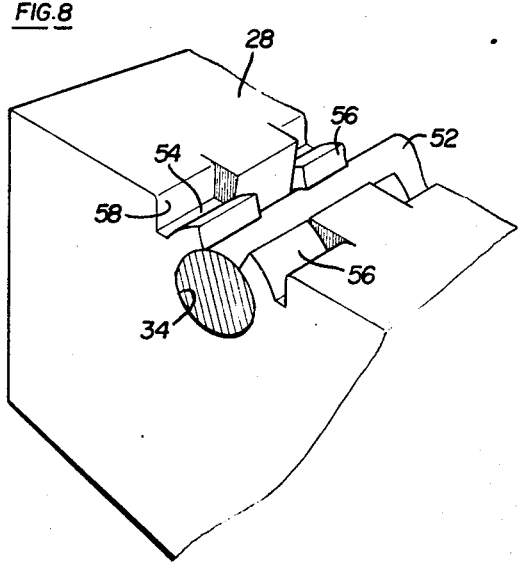
FIG. 8
FIG. 9
INVENTORS
HAROLD A. LADOUCEUR.
BY   J. HORTON MATTHEWS.
CULLEN, SETTLE, SLOMAN & CANTOR.
ATT'YS.

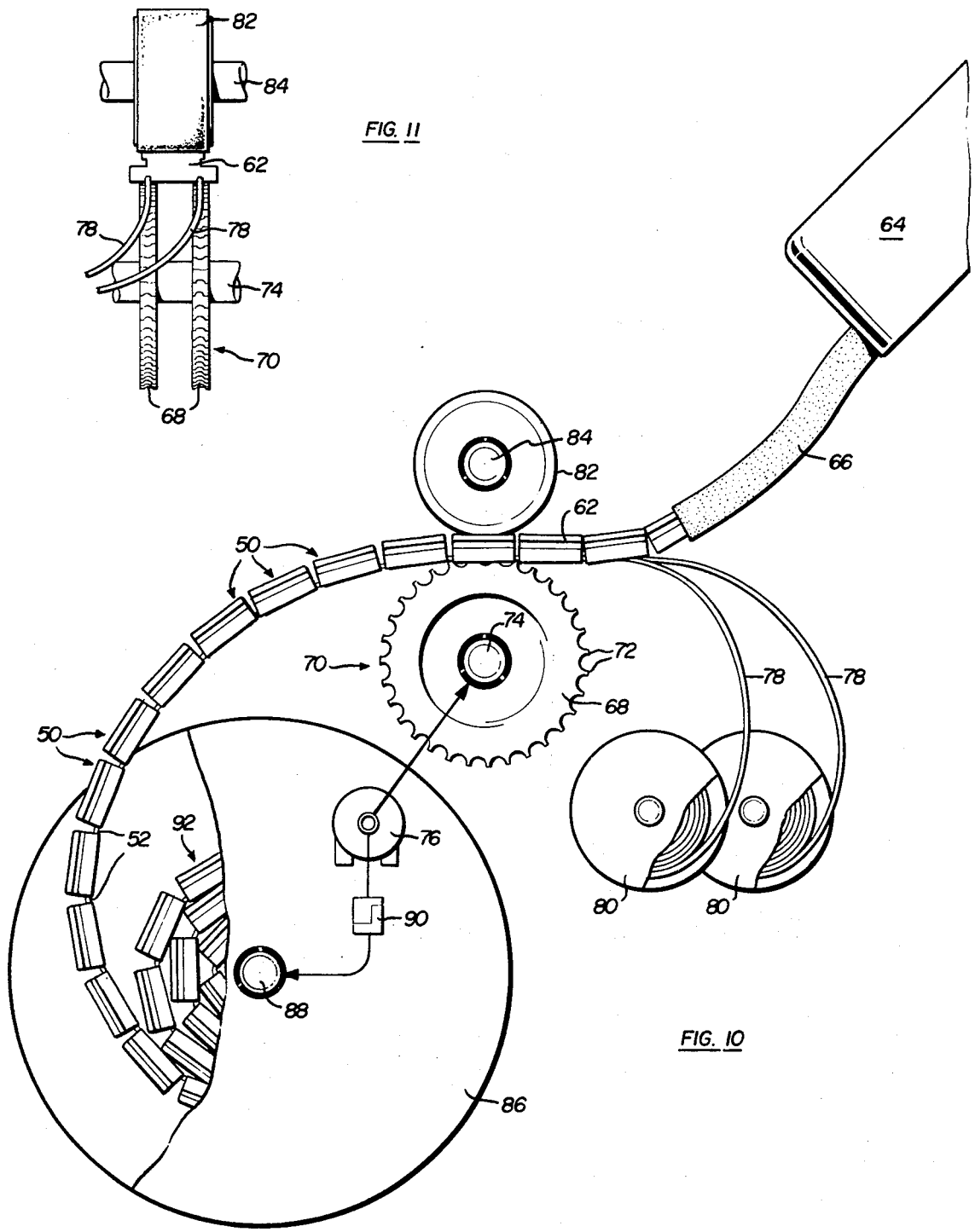

METHOD OF FORMING FASTENER STRIP

FIELD OF THE INVENTION

The invention disclosed herein relates to preoriented fasteners, such as a strip of pierce nuts, which may be rolled into a coil of fasteners for use at the installation site and the method of forming same.

The prior art discloses a number of methods of preorienting fasteners, including a plurality of fasteners in a carrier strip, an integral carrier portion and fasteners secured in a strip on separate carrier members. The utilization of wires as the carrier members. The utilization of wires as the carrier member is also shown by the prior art. None of the preoriented fastener systems shown by the prior art have been commercially successful in retaining preoriented pierce nuts, for example, because the carrier means shown by the prior art interferes with the final installation of the pierce nut or structurally weakens the nut. Examples of the prior art include the following U.S. Pat. Nos.

| | |
|---|---|
| 2,358,777 | 3,115,224 |
| 2,716,247 | 3,117,610 |
| 3,083,429 | 3,117,915. |

In the installation of pierce nuts, clinch nuts, or similar types of multi-threaded piercing fasteners, it is necessary to accurately position the fastener in a predetermined orientation at the point of utilization. Usually, the nuts are not symmetric about the axis of the threaded opening, and consequently, the nuts must be oriented about the axis in order for utilization with the die or punch. In the commercial method of installing pierce nuts, such orientation is accomplished by utilization of a hopper from which nuts are fed through a metallic or plastic feed chute to their point of ultimate use. In a pierce nut installation where a large number of nuts are to be installed in a single press operation, for example, several hoppers must be used. The expense of the hopper and the feed system apparatus, together with the requisite space for hopper installation, may be considerable, and further expenditures are normally required for the maintenance of the hoppers and the required chuting.

U.S. Pat. No. 3,140,010, which is assigned to the assignee of the instant application, discloses a method and apparatus for dispensing fasteners, such as pierce nuts, which includes adhesively fixing the fasteners to a continuous web, advancing the nuts on the web to a stripping location and stripping the fasteners from the web, normally at the point of installation. The instant application is designed to solve some of the problems inherent in the above referenced adhesive oriented fastener system, including elimination of the carrier strip or web, the adhesive bond and the requirement of stripping the fasteners from the carrier.

SUMMARY OF THE INVENTION

The preoriented fastener system of this invention starts with the rolling of a continuous strip of metal having a cross section conforming to the cross section of the fasteners to be formed. The strip is then chopped into separate fasteners and a threaded aperture is formed in each of the separate fasteners. The fasteners are then oriented into serial alignment, corresponding to the original continuous metal strip. The fasteners are joined in a continuous strip by readily frangible connector means connecting adjacent fasteners to one another.

The fasteners system of this invention is partially, although not exclusively, adapted to securing clinch nuts or pierce nuts in a preoriented strip without reducing the structural integrity of the individual nuts. The disclosed piercing fastener includes a rectangular body adapted to be received in a panel aperture, a pair of oppositely extending flanges at the bottom face of the body adapted to overlie the panel, and a threaded aperture extending through the body.

In the preferred embodiment of the fastener, a pair of retainer grooves or slots are provided in one surface of the nut, located between the flanges and the axis of the threaded aperture. The grooves may be located within the thread cylinder in certain applications, however, in the preferred embodiment the grooves are located adjacent the projection of the rectangular body portion or inwardly of the flanges. In the disclosed embodiment of the pierce nut, the retainer grooves are formed in the bottom wall of the fastener opposite the rectangular piercing face, however, the grooves may also be located in top surface or piercing face where spacing and strength requirements permit.

This location of the grooves does not reduce the structural integrity of the nuts, which is particularly important in pierce nuts where the nut is adapted to pierce its own hole in a panel, and does not functionally deform the threaded aperture. In the preferred embodiment, the retainer grooves have a slightly smaller width at the open side to improve the retention of the retaining rods and prevent turning of the rods as described herein below.

The fasteners or nuts in the disclosed method are aligned for securement in side to side relation, with the grooves linearly aligned to receive the rods. The rods are then secured in the grooves to form a continuous, preoriented strip of fasteners, as by deforming the wall of the nut, adjacent the grooves. The nuts in the strip preferably abut or nearly abut, to increase the nuts per unit length of strip and reduce the size of the coil of nuts. Where the nuts in the strip are pierce nuts, for example, the nuts are preferably closely spaced to eliminate wire blanks or tag ends which tend to jam the piercing head. Additional advantages are obtained by providing a slight space between the nuts in the strip, where the space is small enough to avoid tag ends. A slight space provides greater flexibility about the nut coil axis and sufficient flexibility perpendicular to the strip axis, in the plane of the strip, to reduce breakage. A greater shear strength is also obtained, which is important to permit handling of the nuts in the strip or coil form.

In the preferred embodiment of the methods of forming a strip of fasteners, a knurling tool having a plurality of teeth deforms the open end of the grooves, after receipt of the retaining rods or wires. The utilization of a knurling tool provides some unexpected advantages in the method of this invention, including automatically spacing the nuts in the strip. The knurling tool deforms the nut adjacent the groove opening to provide a plurality of retainer portions overlying the wires or rods. Where a circular wire and groove is utilized, the knurling tool also deforms the wire to an oval configuration, which prevents turning of the wire and improving retention. The utilization of a knurling tool has also been found to provide better retention of the retaining rods.

The strip of fasteners may then be rolled in a coil form, with the wires adjacent the axis of the coil, and delivered to the installation station. The end of the coil may then be fed to an installation tool, such as the piercing head of a pierce nut installation system. Where the nuts are closely spaced, a conventional piercing head may be utilized. The separate rods in the fastener strip of this invention substantially reduces waste of materials and fasteners, in that imperfect fasteners may be discarded prior to assembly on the rods, which is not possible where the retainer means are integral with the fasteners.

Other advantages, objects and meritorious features of this invention will more fully appear from the following Description of the preferred embodiments, claims and accompanying drawings.

BRIEF DESCRIPTION OF THE DRAWINGS

FIG. 4 is a top perspective view of one embodiment of the fastener strip of this invention;

FIG. 5 is a side view of the fastener strip shown in FIG. 4;

FIG. 6 is a bottom view of the fastener strip shown in FIG. 5, in the direction of view arrows 6—6;

FIG. 7 is a partial, side cross sectional view of the embodiment of the fastener strip shown in FIG. 6, in the direction of view arrows 7—7;

FIG. 8 is a bottom perspective view of FIG. 7;

FIG. 9 is a partial cross sectional view of another embodiment of the fastener and strip of this invention;

FIG. 10 is a side, partially schematic side elevation of one embodiment of an apparatus adapted to carry out the method of this invention;

FIG. 11 is an end view of a portion of FIG. 10, showing the knurling step;

DESCRIPTION OF THE PREFERRED EMBODIMENTS

Figure 2:
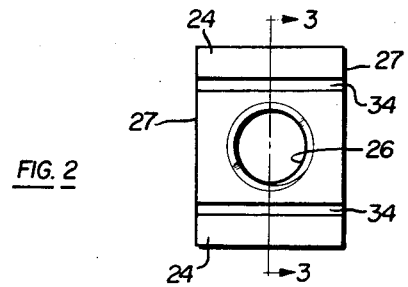
FIG. 2 is a bottom view of the fastener shown in FIG. 1.
Figure 3:
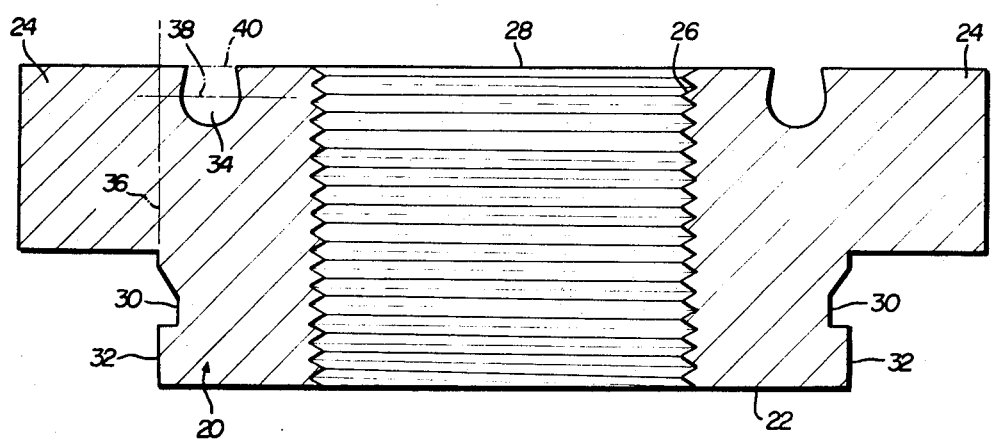
FIG. 3 is a side, cross sectional view of the embodiment of the fastener shown in FIG. 2, in the direction of view arrows 3—3.
Figure 1:
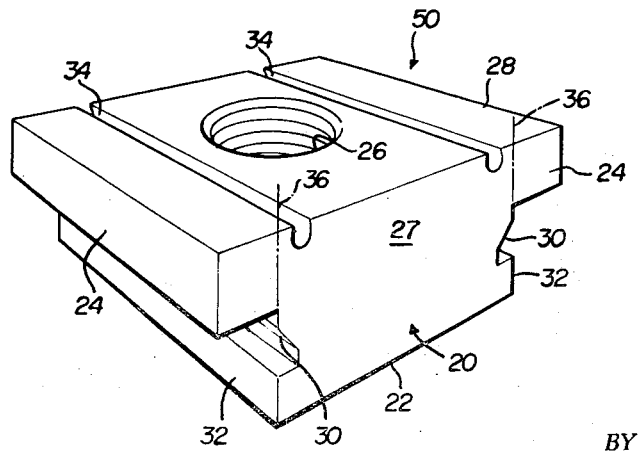
FIG. 1 is a bottom perspective view of one embodiment of the fastener of this invention.

The particular fastener shown in FIGS. 1 to 3 is a multi-purpose pierce and clinch nut, such as disclosed in U.S. Pat. No. 3,187,796, which is assigned to the assignee of the instant application. Reference may be made to the above reference patent for specific details of the pierce nut which are not disclosed herein, including the method of installing the pierce nut in a panel. The pierce nut includes a body portion 20 having a generally rectangular end portion or piercing face 22 at the top or piercing end of the fastener, a pair of oppositely extending flange portions 24 at the bottom 28 of the fastener, one flange extending from each end of the fastener, and a threaded aperture 26 extending through the body portion, perpendicular to the plane including the flange portion 24. The sides 27 of the pierce nut are preferably flat or substantially planar. As described in the above patent, the pierce nut is adapted to pierce its own hole in a panel, wherein the nut serves as the punch, and is forced through the panel or plate to form its own hole. The nut is provided with undercut grooves 30, located between the top of the flange portions 24 and the piercing face of the nut 22, into which the panel is deformed by a die operation to secure the nut to the panel in a single stroke of the press. The grooves 30 define a shoulder 32 which provides the piercing edge of the nut.

In the disclosed embodiment of the fastener of this invention, a pair of linear grooves are defined in the bottom 28 of the nut, generally perpendicular to the axis of the threaded aperture 26 and the side faces of the nut 27, and parallel to the panel receiving grooves 30. The retainer grooves 34 are adapted to receive and secure the retaining rods, as described hereinbelow. Because of the severe loads to which the nut may be subjected and the piercing installation requirements of a pierce nut, the location of the grooves 34 are particularly important to the fastener of this invention. In the preferred embodiment, the grooves are located between the projection 36 of the rectangular piercing face 22 and the axis of the threaded aperture 26. That is, the grooves are preferably located inwardly of the flanges, between the flanges and the axis of the aperture. This location does not functionally decrease the strength of the fastener member, which is particularly important in pierce nut applications, and does not deform or otherwise interfere with the threaded aperture 26. For example, a conventional pierce nut, such as shown in U.S. Pat. No. 3,187,796, failed in an axial loading test at 3,305 pounds average. The same pierce nut, with the retainer grooves 34 open as shown in FIGS. 1 to 3, failed at 2,825 pounds, average. With the wire retainer members inserted and knurled in position, however, as shown in FIGS. 4 to 8, the pierce nuts tested failed at 3,200 pounds, average and the fracture was axially through the center in each case. The difference between the first and last case is therefore not believed to be a result of the retainer grooves and the pierce nut was not weakened by the installation of the retaining rods.

As shown in FIG. 3, the grooves 34 are preferably generally perpendicular to the planar sides of the nuts to permit orientation. In this embodiment, the grooves are circular to receive retaining rods which are generally circular in cross section. In this embodiment, the width of the groove, at the open end 40, is less than the maximum width of the groove 38. The width of the groove at the open end or side 40 is preferably substantially equal to the diameter of the rod or wire and the diameter of the circular portion 38 is preferably slightly larger than the diameter of the wire. The retaining grooves may be formed by conventional rolling techniques, wherein the groove walls are first rolled up, from the wall of the nut, then over the groove. When the wall of the nut is then deformed over the wire, as by knurling, the wire is deformed into an oval cross section, as best shown in FIG. 7. The wire is permitted to expand into the oversize portion of the groove which results in the oval cross section. This dimensional relationship also permits more material to be deformed over the wire and substantially improves the retention of the wire. For example, a groove suitable for a 0.035 inch diameter wire would be 0.040 inches deep, 0.040 inches in width or maximum diameter, at 38, and 0.035 inches in width at the open side 40. The deformation of the wire into an oval cross section not only improves the retention of the wire in the groove, but also inhibits rotation of the wire, and reduces the required knurling pressure.

The preoriented fastener strip shown in FIGS. 4 to 8 includes a plurality of the pierce nuts 50, as described hereinabove. The pierce nuts in the strip may be identical to the pierce nuts described hereinabove and therefore the same reference characters have been used. The nuts are aligned in this embodiment in side to side relation, with the retainer grooves 34 linearly aligned to receive the retaining rods or wires 52. The retaining rods are preferably formed from a relatively flexible material which can be cut off in a die head, especially where the fasteners are pierce nuts, as described above. A suitable material for the rods is annealed 1008 low carbon steel, which is not heat treated. This material provides greater ductility and flexibility than music wire, for example, and does not dull the piercing head as would music wire. Other suitable materials include monofilament nylon cord and cable. Cable may be preferred in certain applications where the fastener strip is handled often.

The pierce nuts are preferably closely spaced for the reasons given hereinabove, however in certain applications the nuts may be spaced as desired on the retaining rods. The sides of the nuts may also abut where space is an important consideration. Where the rods are secured by knurling, the nuts are essentially uniformly spaced. A nut spacing which provides the desired strip flexibility without wire tag ends which tend to jam the piercing head, is 0.005 inches to 0.015 inches. A spacing of 0.060 inches has however been found suitable where tag ends are not a problem.

The knurling tool 70 shown in FIGS. 10 and 11 deforms the bottom 28 of the nut immediately adjacent the retainer groove 34 as shown in FIGS. 7 and 8. The radially extending teeth 72 of the knurling tool deform the metal inwardly to form pockets or grooves 54. The metal is thereby extruded or deformed over the rods 52 to provide retainer portions 56 which securely lock the rods or wires in the retainer grooves. It will be understood that the particular configuration of the notches 54 and the retainer portions 56 depend upon the shape of the teeth 72 on the knurling tool. The teeth 72 of the embodiment of the knurling tool shown provide a generally vertical wall 58 adjacent the retainer portion. This configuration has been found to provide an excellent locking action, however, other knurling teeth configurations may be utilized as required by the installation. As described above, the knurling tool also deforms the generally circular rods or wires into a oval cross section, which aids in the retention of the wires and inhibits rotation. Rotation becomes particularly important where the rods are closely spaced or one rod is utilized in the strip.

The embodiment of the preoriented nut strip shown in FIG. 9 may be identical to the embodiment shown in FIGS. 4 to 8, except the retaining rods 60 in this embodiment are located substantially within the thread cylinder of the threaded aperture 26. The location of the retaining rods 52 immediately adjacent the projection 36 of the rectangular end or top portion 22 is preferred for pierce nuts, however in certain other applications the retainer members may be positioned inward of this position. In FIG. 9, for example, rods 60 are located within the thread cylinder to provide a thread locking feature and greater side flexibility.

In the apparatus shown in FIGS. 10 and 11, the fasteners or nuts 62 are automatically secured on the retaining rods 52 in a strip form 50, as described above, and coiled for use at the nut installation station, described hereinbelow. The nuts may be oriented in a conventional hopper, such as described in U.S. Pat. No. 3,334,724 and 3,430,808, which are assigned to the assignee of the instant application. The nuts are fed from the hopper through a suitable chuting 66, as described in the above patents to the knurling tool 70. The knurling station in this embodiment includes a pair of knurling tools 68 having a plurality of radially extending teeth 72 as described hereinabove. The knurling tools are mounted on a suitable shaft 74 which is driven by a motor 76. The drive mechanism is shown, as any suitable drive means may be utilized. Where two retaining rods or wires are used in the preoriented nut strip, a pair of wires 78 are fed to the knurling tool 70 from freely rotatable spools 80.

The motor driven knurling tools 68, in this embodiment are rolled over the wires 78 to deform the bottom of the pierce nut, as described hereinabove. A backup or support roller 82 is provided, in this embodiment, which is mounted on a shaft 84. The preoriented nut strip 50 is then coiled on a motor driven nut coil spool 86. The spool is mounted on a shaft 88, which is also driven by motor 76 through clutch mechanism 90. The clutch mechanism is provided to prevent pulling apart or deformation of the nut coil strip. It will be noted that the preoriented nut strip 50 is coiled with the retaining rods or wires 52 at the inner end of the pierce nuts, adjacent the axis 88 of the coil. When the coil of nuts 92 is completed, the apparatus is stopped and the coil is delivered to an installation station such as in FIG. 12.

Figure 12:
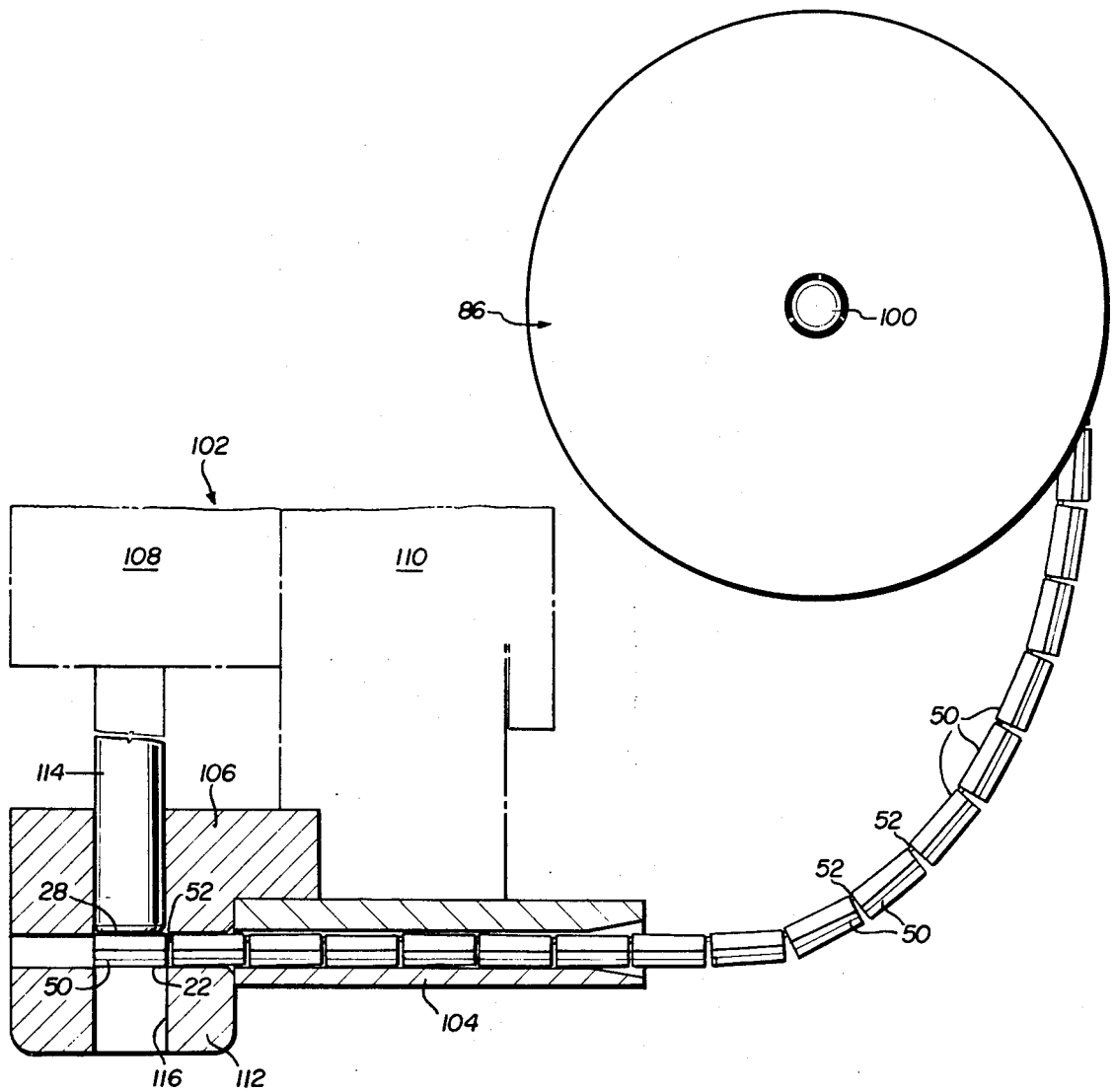
FIG. 12 is a partially cross sectioned end view of the installation apparatus of the fastener strip of this invention, showing the installation step in the method of this invention.

FIG. 12 illustrates, somewhat schematically, one embodiment of a pierce nut installation apparatus suitable for securing a pierce nut from the preoriented nut coil strip of this invention. Reference may be made to U.S. Pat. Nos. 3,089,670 and 3,098,576, which are assigned to the assignee of the instant application, for a more detailed description of a pierce nut head assembly and the method of securing a pierce nut to a panel or the like. As described above, a pierce nut serves as the piercing punch in the installation assembly and the pierce nut head is adapted to be installed directly in a forming press, or the like. The pierce nut is thus adapted to pierce its own hole in a panel, or the like, and is secured within the panel opening in a single stroke of the press. In the disclosed embodiment of the pierce nut, the panel is deformed into the grooves 30 adjacent the flange portion 24, however, various other designs of pierce nuts and clinch nuts may also be utilized in the preoriented fastener system of this invention and the installation apparatus shown in FIG. 12.

The installation assembly shown in FIG. 12 includes the nut coil spool 86 which may be formed by the apparatus shown in FIG. 10. In this embodiment, however, the supporting shaft 100 is rotatable to feed the preoriented pierce nuts 50 to the head assembly, indicated generally at 102. The end of the preoriented pierce nut strip or coil is fed to the feed block 104, which includes a tapered opening to receive the nuts. The nuts are finally received in the lower housing assembly 106. The upper housing assembly 108 and guide post assembly 110 are only outlined in FIG. 12 to show their location. The feeding apparatus, which may be any conventional fastener feed assembly has not been shown. The panel, which is to receive the pierce nut, is disposed between the nose piece 112 of the lower housing assembly and a die member, not shown. Reference may be made to the above referenced patents for the operation of the head assembly the structure of the die member. In this embodiment, the plunger 114 is actuated toward the panel to engage the bottom 28 of the pierce nut 50 shearing the retaining rods and forcing the pierce nut through the opening 116 against the panel. The force of the plunger 114 causes the generally rectangular top portion 22 of the pierce nut to pierce the panel in one stroke of the plunger, and the die member forces the pierced wall of the panel into the grooves 30 of the nut.

Figure 13:
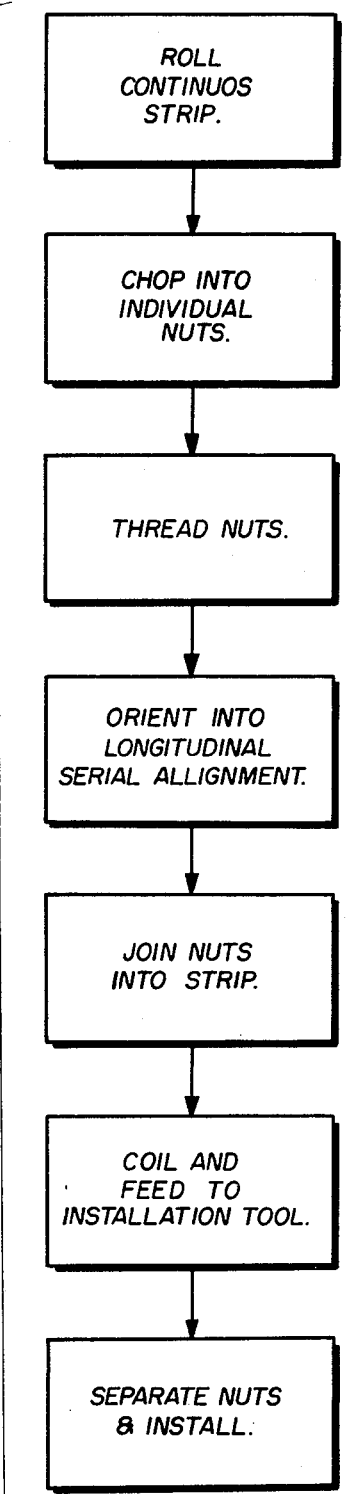
FIG. 13 is a flow diagram of the method of this invention.
Figure 14:
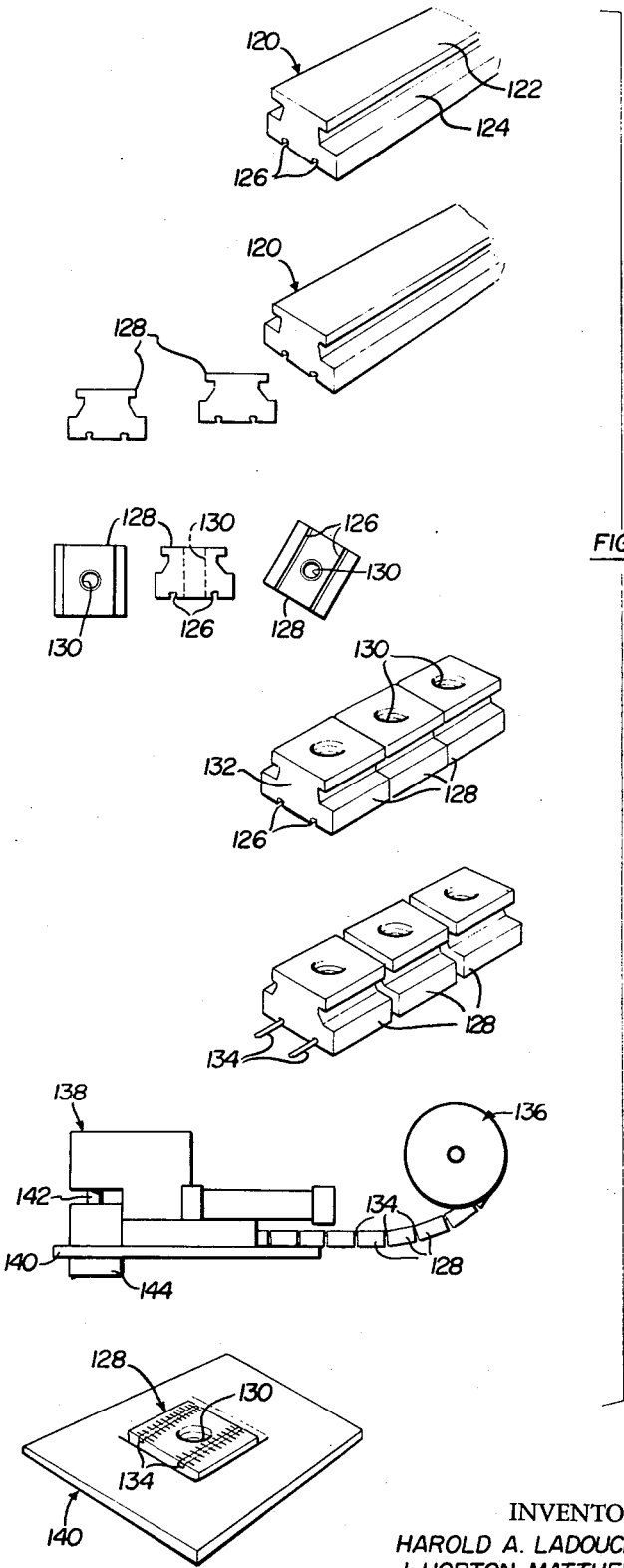
FIG. 14 illustrates the steps in the method shown in FIG. 13.

FIGS. 13 and 14 disclose the overall method of forming the preoriented nut strip of this invention and the installation of a nut from the strip. The strip 120 may be rolled or otherwise formed in a continuous rolling mill or the like. In the commercial method of forming pierce nuts, the strip 120 is rolled from round wire stock, such as resulfurized 1108 steel. It will be noted that the cross section of the strip 120 corresponds to the cross section of the pierce nut described hereinabove, including the generally rectangular body portion 122 and the opposed flanges 124. The disclosed embodiment of the strip also includes a pair of retainer grooves 126 which may be rolled in the strip 120 at the mill. The strip is then chopped into separate or individual fasteners or pierce nuts 128. In the commercial process, the metal strip is received in a sizing die, pierced and sheared in a continuous blanking press. The pierced aperture is then threaded in a tapping machine, forming a threaded aperture 130. A conventional continuous tapping machine may be utilized.

The individual nuts are then oriented into serial alignment, which in the preferred embodiment corresponds to the continuous metal strip 120. In the disclosed method, the nuts are aligned in side to side relation with the side walls 132 abutting and the grooves 126 coaxially aligned. The nuts may be oriented in a conventional rotating hopper, or the like, such as disclosed in FIG. 10. The nuts are then joined in the oriented serial alignment by readily frangible connector means, which connects adjacent nuts one to another. In the disclosed embodiment, the frangible connection means is the pair of wires or rods 134. The rods are inserted into the grooves 126 and secured by the apparatus shown in FIGS. 10 and 11 or other suitable means.

The preoriented fastener strip may then be coiled as shown in FIG. 10. Finally, the fastener coil 136 may b fed to an installation tool 138, wherein the nut is secured to a panel 140 or the like. A pierce nut installation tool is shown in FIG. 12 at 102, which includes an actuatable plunger 114. Following the method disclosed in FIG. 12, the pierce nuts 128 are serially interposed between an actuatable plunger 142 and the panel 140 as shown in FIGS. 13 and 14, in which a pierce nut is to be installed. The plunger is then actuated toward the panel, to sever the frangible joining means of the interposed pierce nut, from the coil 136, and to pierce the severed nut 128 through the panel, in a single stroke of the plunger 142. The frangible joining means in the disclosed embodiment are the rods 134. The panel in the disclosed embodiment is forced into the grooves 30 (See FIGS. 3 to 7) by the die member 144, to securely lock the nut in the panel opening, as previously described. Other securement means, including staking, may also be utilized.

It will be understood that the preoriented fastener system and method of this invention is not exclusive to pierce nuts or clinch nuts, except as claimed hereinbelow. The invention does however have particular application to the pierce nut system because of the rigid strength and tolerance requirements of a self-piercing fastener, the problems of the commercial high speed feeding equipment, including the space and service requirements of the hoppers and chuting, and the desire to utilize the present manufacturing and installation apparatus and techniques of the pierce nut system wherever possible. The preoriented fastener system and method of this invention eliminates the requirement of hoppers, chuting and other feed equipment at the installation site which is particularly important in the relatively complex pierce nut installation apparatus.

We claim:

1. In a method of forming a strip of nuts preoriented for installation in a panel or the like, the steps of:
    a. forming a continuous strip of metal having a cross section conforming to the cross section of the nuts to be formed,
    b. chopping said continuous strip into separate nuts,
    c. forming a threaded aperture in each of said separate nuts,
    d. orienting said separate nuts into serial alignment corresponding to said continuous strip, and
    e. joining said nuts in said oriented serial alignment by readily frangible connector means connecting adjacent nuts to one another.

2. The method defined in claim 1, wherein said continuous metal strip is formed by rolling.

3. A method of forming a strip of fasteners, comprising, the steps of:
    a. forming a plurality of individual fasteners,
    b. forming at least one retainer groove in an exposed surface of each of the fasteners, said groove having an open side,
    c. preassembling said plurality of fasteners in a contiguous row, in which (1) the fasteners are substantially abutting and (2) the grooves are coaxially aligned.
    d. inserting a retaining rod in the coaxially aligned grooves of the fasteners to bridge adjacent fasteners, and e. knurling the fastener at the open side of the coaxially aligned grooves, (1) to deform the fastener adjacent the groove opening to provide a plurality of retainer portions overlying the retaining rods and, (2) substantially uniformly spacing adjacent fasteners.

4. The method of forming a strip of fasteners defined in claim 3, characterized in that said retainer groove and retaining rod are generally circular in cross section, wherein the knurling deforms the retaining rod to be generally oval in cross section, having a major diameter perpendicular to the axis of the rod, aiding the retention of the fasteners on the retaining rods.

5. The method of forming a strip of fasteners defined in claim 3, including the step of forming a threaded aperture in each of the fasteners and locating the retainer grooves so as not to deform the threaded aperture.

6. The method of forming a strip of fasteners defined in claim 5, including the steps of forming two retainer grooves in one wall of each of the fastener members on opposite sides of said threaded aperture, aligning said fasteners with the retainer grooves coaxially aligned, inserting a retaining rod in each of the coaxially aligned retainer grooves and rolling a generally cylindrical knurling tool over each of the retainer grooves.

7. The method of forming a strip of fasteners defined in claim 3, including the step of;
f. rolling the strip of fasteners into a coil, wherein the retaining rods are disposed on the inside of the coil, toward the axis of the coil.

8. In a method of forming a strip of fasteners each fastener having a generally rectangular body portion and a pair of oppositely disposed essentially planar flange portions adjacent the bottom of the fastener, one flange portion extending from each end of the fastener, and a threaded aperture having an axis generally perpendicular to the plane of the flange portions, the steps of;
a. forming two parallel retainer grooves on opposite sides of the axis of the threaded aperture on the bottom wall of said fasteners and inwardly of said flanges,
b. aligning said fasteners with the retainer grooves coaxially aligned with the adjacent fasteners,
c. bridging adjacent fasteners by inserting a retaining rod in the coaxially aligned grooves of said adjacent fasteners, and
d. deforming the fasteners adjacent the groove openings to secure the retaining rods.

9. The method of forming a strip of fasteners defined in claim 8, wherein said retainer grooves are rolled into the bottom wall of said fastener members, between the projection of said body portion and the axis of the thread cylinder, adjacent the projection of the body portion so as not to deform the thread cylinder.

10. The method of forming a strip of fasteners defined in claim 8, wherein said retainer grooves are rolled in the bottom wall of said fasteners, substantially in the thread cylinder of said threaded aperture.

11. The method of forming a strip of fasteners defined in claim 8, including the step of rolling the strip of fasteners into a coil, with the retaining rod located at the inner end of the fasteners in the coil.

12. The method of forming a strip of fasteners defined in claim 8, wherein said fasteners are aligned in substantially abutting, side to side relation, and said fasteners are deformed by a knurling tool adapted to substantially uniformly space the fasteners in the strip 13. A method of forming a coil of fasteners, comprising the steps of;
a. forming a plurality of individual fasteners each having a generally rectangular top portion and a pair of flanges adjacent the bottom of the fastener, one flange extending from opposite ends of the fastener,
b. forming a threaded aperture in each of the fasteners.
c. forming a pair of retainer grooves in the bottom wall of each of the fastener members, said grooves located between the flange portions and the axis of the threaded aperture, such that the thread cylinder is not deformed and the flange portions are not substantially weakened,
d. aligning the fastener members in side to side relation with the retainer grooves coaxially aligned,
e. inserting a retaining rod in each of the coaxially aligned retainer grooves,
f. deforming the bottom wall of the fasteners adjacent the grooves to provide a retainer portion overlying the open side of the retainer grooves and securely retain the fasteners on the retaining rods in a strip, and
g. rolling the strip of fasteners into a coil, with the bottom wall of the fasteners disposed toward the axis of the coil, arcuately deforming said retaining rods within their elastic limit.

* * * * *